(No Model.)

C. W. HERSEY.
WHIFFLETREE.

No. 281,065. Patented July 10, 1883.

WITNESSES
Fred G. Dieterich
Arthur L. Morsell

Cyrus W. Hersey,
INVENTOR
By Louis Bagger & Co.
Attorney

UNITED STATES PATENT OFFICE.

CYRUS W. HERSEY, OF PEABODY, MASSACHUSETTS.

WHIFFLETREE.

SPECIFICATION forming part of Letters Patent No. 281,065, dated July 10, 1883.

Application filed May 15, 1883. (No model.)

*To all whom it may concern:*

Be it known that I, CYRUS W. HERSEY, of Peabody, in the county of Essex and State of Massachusetts, have invented certain new and useful Improvements in Whiffletrees; and I do hereby declare that the following is a full, clear, and exact description of the invention, which will enable others skilled in the art to which it appertains to make and use the same, reference being had to the accompanying drawings, which form a part of this specification, and in which—

Figure 1:
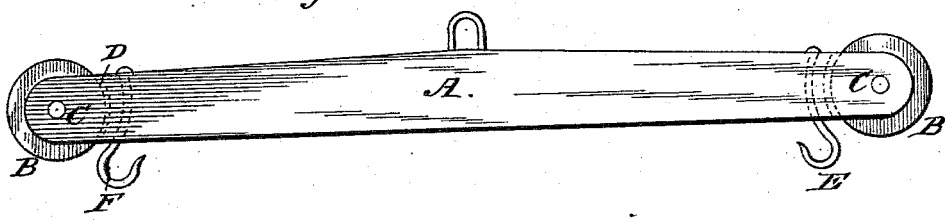
Figure 2:
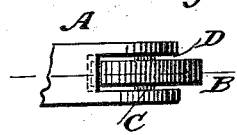
Figure 3:
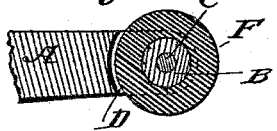

Figure 1 is a plan or top view of my improved whiffletree. Fig. 2 is a side view of one end of the same, and Fig. 3 is a horizontal sectional view, illustrating a modification of my improvement.

Similar letters of reference indicate corresponding parts in all the figures.

My invention has relation to whiffletrees for wagons or vehicles, or for agricultural implements—such as plows, cultivators, harrows, &c.—and is applicable alike to "double-trees" and "single-trees."

It consists in constructing the extreme ends of the whiffletree with rollers, whereby I prevent abrading or injuring fruit-trees or other trees among which the wagon or implement to which the whiffletree is applied is used.

In harrowing or cultivating the soil in orchards between fruit-trees, especially where these are planted closely together, it often occurs that the projecting ends of single-trees or double-trees, by striking against the bark of the young trees, will seriously injure the same. To prevent accidents of this kind, I have provided the whiffletree shown at A with circular disks or rollers B B, pivoted upon bolts C and working in slots or recesses D, made in opposite ends of the whiffletree. Draft chains or traces are attached to hooks E, firmly secured to the whiffletrees back of the rollers, as clearly shown in the drawings.

From the foregoing description, taken in connection with the drawings, the operation and advantages of my improved whiffletree will be readily understood without requiring extended explanation. The rollers B may be made of wood or any other suitable material; or, if desired, they may be made of metal provided with a rubber tire, as shown at F in Fig. 3, whereby their efficiency may be still more increased.

Having thus described my invention, I claim and desire to secure by Letters Patent of the United States—

1. As an improvement in whiffletrees, a whiffletree recessed horizontally at opposite ends, and provided with rollers inserted into said recesses, and projecting therefrom, substantially as and for the purpose shown and set forth.

2. A whiffletree recessed horizontally at its extreme ends, and having rollers provided with rubber tires inserted into said recesses and projecting therefrom, substantially as and for the purpose shown and set forth.

3. The improved whiffletree herein shown and described, provided with hooks for the attachment of single-trees, draft chains or traces, and having friction-rollers inserted into and projecting from recesses in its extreme ends, as and for the purpose shown and set forth.

In testimony that I claim the foregoing as my own I have hereunto affixed my signature in presence of two witnesses.

CYRUS W. HERSEY.

Witnesses:
EDWARD BURRILL, Jr.,
NATHAN M. HAWKES.